United States Patent [19]

Joynt et al.

[11] 4,114,944
[45] Sep. 19, 1978

[54] TELESCOPIC TAILGATE EXTENSION

[75] Inventors: Gerald E. Joynt, Sergeant Bluff; Michael R. Mayhew, Sioux City, both of Iowa

[73] Assignee: Multech Corp., Sioux City, Iowa

[21] Appl. No.: 774,645

[22] Filed: Mar. 4, 1977

[51] Int. Cl.² .............................................. B62D 33/00
[52] U.S. Cl. ........................................ 296/50; 214/85
[58] Field of Search .................... 296/50, 53, 55, 26; 214/85, 83.24, 505; 224/42.43

[56] References Cited

U.S. PATENT DOCUMENTS

| | | | |
|---|---|---|---|
| 2,703,658 | 3/1955 | Bazzell | 214/505 |
| 3,142,394 | 7/1964 | Schwartz | 214/85 |
| 3,257,020 | 6/1966 | Fairclough | 214/83.24 |
| 3,349,931 | 10/1967 | Wagner | 296/26 X |
| 3,768,673 | 10/1973 | Nydam et al. | 296/26 X |
| 3,889,827 | 6/1975 | Fine | 296/61 X |

Primary Examiner—Joseph F. Peters, Jr.
Assistant Examiner—Gene A. Church
Attorney, Agent, or Firm—Clarence A. O'Brien; Harvey B. Jacobson

[57] ABSTRACT

An extendible tailgate assembly for a load carrying vehicle has a tailgate pivotally mounted on the main frame of the vehicle and slidably supporting an extendible member arranged for reciprocating movement relative to the tailgate and increasing and decreasing the extent of the tailgate assembly. The extendible member is guided relative to the tailgate by a linkage which assures parallel movement of the extendible member relative to the tailgate.

10 Claims, 3 Drawing Figures

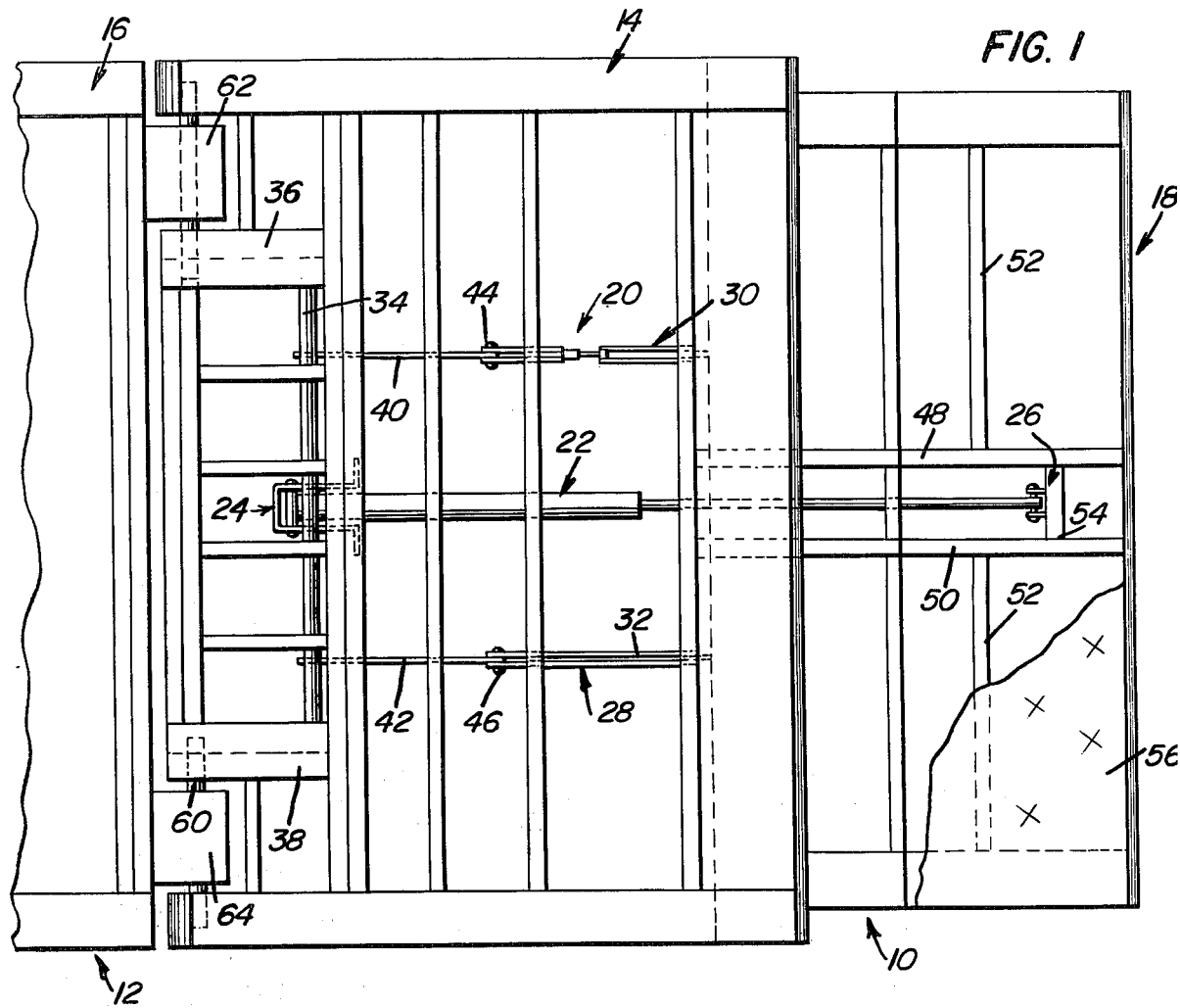
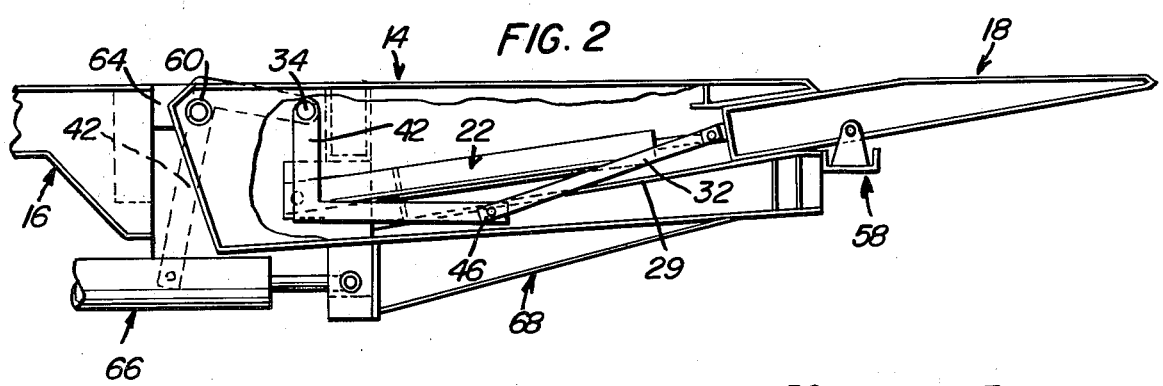
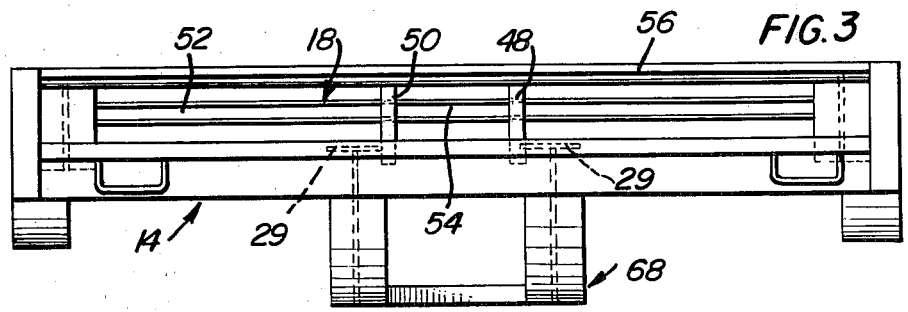

TELESCOPIC TAILGATE EXTENSION

BACKGROUND OF THE INVENTION

1. Field of the Invention

This invention relates generally to load carrying tailgates for semitrailers, and the like, and particularly to an extendible tailgate for use with equipment trailers.

2. Description of the Prior Art

It is frequently desirable to vary the length of a tailgate of a semitrailer of the type primarily intended for hauling heavy equipment so as to take advantage of local conditions and regulations affecting the over-all length of the trailer. The conventional tailgates are provided with a folding tailgate extension hinged to the main tailgate section which makes it necessary to raise the main tailgate above a level position so as to disturb any load on the tailgate in order to actuate the tailgate extension.

In addition to permitting the length of a trailer to be varied, the tailgate is also swingably mounted so as to selectively form a loading and unloading ramp for the trailer. If the load extends onto the tailgate, the conventional style of gate does not readily permit the extendible section to be unfolded from the main section since the main tailgate section must be swung upwardly against the weight of the load. Examples of tailgates which selectively form loading and unloading ramps by means of sections which fold relative to a main section of the tailgate can be found in U.S. Pat. Nos. 2,727,781, dated Dec. 20, 1955, to A. R. D'Eath; 2,776,063, issued Jan. 1, 1957, to L. L. Larson; and 2,797,960, issued July 2, 1957, to L. J. Endres, et al. These prior art tailgates, however, are intended to be arranged in a position blocking the rear of the load carrying area of the vehicle, and are not readily arrangeable in a substantially level load-carrying orientation.

It is generally known to provide telescopically extendible ramps for facilitating loading and unloading vehicles, examples of which can be found in U.S. Pat. Nos: 460,196, issued Sept. 29, 1891, to L. J. Chase; and 2,611,466, issued Sept. 23, 1952, to D. R. Biggert, et al. These telescopically adjustable ramps, however, are not intended for use as load carrying tailgates for equipment-hauling semitrailers, and the like.

SUMMARY OF THE INVENTION

It is an object of the present invention to provide a load-carrying extendible tailgate assembly for equipment moving semitrailers, and the like, which permits the tailgate assembly to be extended without disturbing a load on the assembly.

It is another object of the present invention to provide an extendible tailgate assembly which permits the length of an associated equipment moving semitrailer to be continuously varied over a predetermined range as conditions and regulations allow.

These are other objects are achieved according to the present invention by providing an extendible tailgate assembly having: a tailgate connected to the main frame of a load carrying vehicle; an extendible member mounted on the tailgate for reciprocating movement relative to the tailgate and extending into and out of the tailgate for varying the extent of the tailgate assembly; and an actuator arrangement mounted on the tailgate and connected to the extendible member for moving same.

The actuator arrangement advantageously includes a linear fluid motor, and the like, connected to the tailgate and to the extendible member for extending and retracting the extendible member out of and into the tailgate. A guide assembly is connected to the tailgate and to the extendible member for guiding the extendible member while same is being extended and retracted.

The guide assembly preferably includes a linkage comprising a pair of spaced, substantially parallel linkage arms pivotally attached to the extendible member. A torque member extends laterally of the tailgate, and has affixed thereto a pair of cranks pivotally attached to respective ones of the linkage arms. By this arrangement, the torque member forces the linkage arms to operate simultaneously and keep the extendible member on a parallel motion relative to the tailgate. The actuating motor is advantageously disposed midway between and extending parallel to the linkage arms so as to provide an even force on the extendible member.

The tailgate is pivotally mounted on the main frame of the vehicle for swinging movement relative to the main frame. A hinge pin pivotally mounts the tailgate on the main frame, while a further motor connected to the main frame and to the tailgate selectively swings the tailgate relative to the main frame as desired.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, schematic, top plan view showing an extendible tailgate assembly according to the present invention mounted on the rear end of the main frame of a semitrailer FIG. 2 is a fragmentary, schematic side elevational view, partly cut away and in section, showing the tailgate assembly of FIG. 1.

FIG. 3 is an end elevational view looking from the right in FIGS. 1 and 2.

DESCRIPTION OF THE PREFERRED EMBODIMENTS

Referring now more particularly to the figures of the drawings, an extendible tailgate assembly 10 according to the present invention is shown as pivotally mounted on load carrying vehicle 12, which may be a semitrailer such as conventionally employed for hauling heavy equipment, and the like. Assembly 10 includes a tailgate 14 connected to the main frame 16 of vehicle 12, and an extendible member 18 mounted on the tailgate 14 for reciprocating movement out of and into the tailgate 14 so as to increase and decrease the extent of assembly 14 as an extension of the longitudinal extent of the main frame 16 of vehicle 12. Mounted on the tailgate 14 and connected to the extendible member 18 for moving same is an actuator arrangement 20.

Arrangement 20 includes a, for example, hydraulically actuated linear motor 22 connected to the tailgate 14 as by a suitable bracket 24 and to the extendible member 18 as by bracket 26 for extending and retracting extendible member 18 relative to tailgate 14. It will be appreciated that the pivotal mounting of the cylinder and piston of motor 22 to the brackets 24 and 26, respectively, will permit extendible member 18 to move in a generally planar path relative to tailgate 14. A guide assembly 28 is connected to tailgate 14 and extendible member 18 for guiding extendible member 18 along tracks 29 while member 18 is being extended and retracted out of and into tailgate 14.

Guide assembly 28 includes a linkage which comprises a pair of spaced, substantially parallel linkage arms 30 and 32 pivotally attached to the extendible member 18, and a torque member 34 extending laterally of tailgate 14 and journaled in blocks 36 and 38 partially forming the tailgate 14. Cranks 40 and 42 are affixed to torque member 34 and pivotally attached to the linkage arms 30 and 32, respectively, as by pins 44 and 46 in a conventional manner, such that torque member 34 will force the linkage arms 30 and 32 to operate simultaneously and keep the extendible member 18 on a parallel motion relative to tailgate 14. Further, the motor 22 is disposed substantially midway between the linkage arms 30 and 32 so as to exert an even force on the linkage arms 30, 32 and additionally assure the proper movement of extendible member 18 relative to tailgate 14.

Extendible member 18 includes a pair of substantially parallel braces 48 and 50 disposed in slightly spaced relationship to one another midway between side walls of the extendible member 18, between which side walls and the braces 48, 50 extend braces 52. Between the braces 48 and 50 is disposed a plate 54 to which bracket 26 is anchored. Thus, the braces 48 and 50 essentially form a channel in which the piston rod of motor 22 is received.

Extendible member 18 is covered with a suitable covering 56, such as steel sheet, and the like, with it being understood that tailgate 14 would be similarly covered in a suitable manner (not shown).

A roller device, such as that designated 58, or other suitable guide, is advantageously disposed along the lateral edges of extendible member 18, and mounted on the front end of tailgate 14, for still further assuring that extendible member 18 will slide in a predetermined manner relative to tailgate 14. In addition, the roller device 58, of which only one is shown although it is to be understood two may be employed on each lateral side of extendible member 18, may also act as friction reducing arrangements during sliding movement of extendible member 18.

Tailgate 14 is pivotally mounted on the main frame 16 of vehicle 12 for swinging movement relative thereto. A hinge pin 60 journaled in blocks 36 and 38 as well as bearing 62 and 64 provided in extensions of main frame 16 is advantageously employed for pivotally mounting tailgate 14 on the main frame 16 so as to assure that the tailgate 14 will not pull loose from the frame of the vehicle. A further motor 66 is connected to main frame 16 and tailgate 14 in a suitable manner for selectively swinging tailgate 14. A generally wedge-shaped portion 68 is provided on the lower surface of tailgate 14 so as to form an abutment to pivotally receive the, for example, piston rod of motor 66 and permit the latter to selectively swing tailgate 14 about the generally horizontally disposed and laterally extending hinge pin 60. By such an arrangement, tailgate assembly 10 not only serves as a ramp for the loading and unloading of the vehicle 12, but will also permit the tailgate assembly 10 to carry a, for example, 20,000 pound evenly distributed load.

As can be readily understood from the above description and from the drawings, an extendible tailgate assembly according to the present invention provides a simple, yet rugged and reliable, load carrying structure which permits the over-all length of the associated vehicle to be varied as desired without disturbing a load being carried on the tailgate assembly. Further, the tailgate assembly can be readily employed as a loading and unloading ramp for the vehicle, with the use of fluid motors to actuate the extendible member of the tailgate assembly, as well as to swing the tailgate assembly itself relative to the main frame of the vehicle, facilitating operation of the invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An extendible tailgate assembly for a load carrying vehicle, comprising, in combination:
   (a) a tailgate connected to a main frame of a load carrying vehicle;
   (b) an extendible member mounted on the tailgate for reciprocating movement relative to the tailgate and varying the extent of the tailgate assembly; and
   (c) actuator means mounted on the tailgate and connected to the extendible member for moving same relative to the tailgate, the actuator means including, in combination:
   (1) motor means connected to the tailgate and to the extendible member for extending and retracting the extendible member out of and into the tailgate, the latter forming a socket for receiving the extendible member; and
   (2) guide means connected to the tailgate and to the extendible member for guiding the extendible member while same is extended and retracted, the guide means including a linkage comprising a pair of spaced, substantially parallel linkage arms pivotally attached to the extendible member, and a torque member extending laterally of the tailgate and pivotally mounted thereon, cranks affixed to the torque member and pivotally attached to the linkage arms, the torque member forcing the linkage arms to operate simultaneously and keep the extendible member on a parallel motion relative to the tailgate.

2. A structure as defined in claim 1, wherein the motor means includes a linear fluid motor disposed substantially midway between and extending parallel to the linkage arms.

3. A structure as defined in claim 2, wherein the tailgate is pivotally mounted on the main frame of the vehicle for swinging movement relative thereto, a hinge pin pivotally mounting the tailgate on the main frame and permitting the tailgate to carry a load without pulling away from the main frame, and a further motor means connected to the main frame and to the tailgate for selectively swinging the tailgate relative to the main frame of the vehicle.

4. A structure as defined in claim 1, wherein the tailgate is pivotally mounted on the main frame of the vehicle for swinging movement relative thereto, a hinge pin pivotally mounting the tailgate on the main frame and permitting the tailgate to carry a load without pulling away from the main frame, and a further motor means connected to the main frame and to the tailgate for selectively swinging the tailgate relative to the main frame of the vehicle.

5. An extendible tailgate assembly for a load carrying vehicle, comprising, in combination:
   (a) a tailgate connected to a main frame of a load carrying vehicle;
   (b) an extendible member mounted on the tailgate for reciprocating movement relative to the tailgate and varying the extent of the tailgate assembly; and
   (c) actuator means mounted on the tailgate and connected to the extendible member for moving same relative to the tailgate, the tailgate being pivotally mounted on the main frame of the vehicle for swinging movement relative thereto, a hinge pin pivotally mounting the tailgate on the main frame and permitting the tailgate to carry a load without pulling away from the main frame, and a motor means connected to the main frame and to the tailgate for selectively swinging the tailgate relative to the main frame of the vehicle.

6. A structure as defined in claim 3, wherein the actuator means includes, in combination:
   (1) motor means connected to the tailgate and to the extendible member for extending and retracting the extendible member out of and into the tailgate, the latter forming a socket for receiving the extendible member; and
   (2) guide means connected to the tailgate and to the extendible member for guiding the extendible member while same is extended and retracted.

7. In combination with a load carrying vehicle including a longitudinally extending main frame having a rear end and a lateral extent, an extendible tailgate assembly, comprising, in combination:
   (a) a tailgate connected to the rear end of the main frame of the load carrying vehicle;
   (b) an extendible member mounted on the tailgate for reciprocating movement relative to the tailgate and varying the extent of the tailgate assembly; and
   (c) actuator means mounted on the tailgate and connected to the extendible member for moving same relative to the tailgate, the actuator means including, in combination:
      (1) motor means connected to the tailgate and to the extendible member for extending and retracting the extendible member out of and into the tailgate, the latter forming a socket for receiving the extendible member; and
      (2) guide means connected to the tailgate and to the extendible member for guiding the extendible member while same is extended and retracted, the guide means including a linkage comprising a pair of spaced, substantially parallel linkage arms pivotally attached to the extendible member, and a torque member extending laterally of the tailgate and pivotally mounted thereon, cranks affixed to the torque member and pivotally attached to the linkage arms, the torque member forcing the linkage arms to operate simultaneously and keep the extendible member on a parallel motion relative to the tailgate.

8. In combination with a load carrying vehicle including a longitudinally extending main frame having a rear end and a lateral extent, an extendible tailgate assembly, comprising, in combination:
   (a) a tailgate connected to the rear end of the main frame of the load carrying vehicle;
   (b) an extendible member mounted on the tailgate for reciprocating movement relative to the tailgate and varying the extent of the tailgate assembly; and
   (c) actuator means mounted on the tailgate and connected to the extendible member for moving same relative to the tailgate, the tailgate being pivotally mounted on the main frame of the vehicle for swinging movement relative thereto, a hinge pin pivotally mounting the tailgate on the main frame, the hinge pin being disposed in a substantially horizontal plane and arranged extending laterally of the main frame of the vehicle, and a motor means connected to the main frame and to the tailgate for selectively swinging the tailgate about the hinge pin for selectively permitting the tailgate assembly to function as a load carrying arrangement and as a ramp facilitating loading and unloading of the vehicle.

9. A structure as defined in claim 8, wherein the actuator means includes, in combination:
   (1) motor means connected to the tailgate and to the extendible member for extending and retracting the extendible member out of and into the tailgate, the latter forming a socket for receiving the extendible member; and
   (2) guide means connected to the tailgate and to the extendible member for guiding the extendible member while same is extended and retracted.

10. In combination with a load carrying vehicle including a longitudinally extending main frame having a rear end and a lateral extent, an extendible tailgate assembly, comprising, in combination:
   (a) a tailgate connected to the rear end of the main frame of the load carrying vehicle, the tailgate being pivotally mounted on the main frame of the vehicle for swinging movement relative thereto;
   (b) a hinge pin pivotally mounting the tailgate on the main frame, the hinge pin being disposed in a substantially horizontal plane and arranged extending laterally of the main frame of the vehicle; and
   (c) motor means connected to the main frame and to the tailgate for selectively swinging the tailgate about the hinge pin for selectively permitting the tailgate assembly to function as a load carrying arrangement and as a ramp facilitating loading and unloading of the vehicle.

* * * * *